Oct. 30, 1951   E. L. DENNIS   2,573,550
DOUGH BLENDER
Filed March 29, 1947

Inventor
E. Lucian Dennis

Andrew F. Wintercorn
Atty.

Patented Oct. 30, 1951

2,573,550

UNITED STATES PATENT OFFICE 2,573,550

DOUGH BLENDER

E. Lucian Dennis, Rockford, Ill., assignor to The Washburn Company, Worcester, Mass., a corporation of Massachusetts Application March 29, 1947, Serial No. 738,198

8 Claims. (Cl. 259—144)

This invention relates to kitchen utensils generally, but has particular reference to an improved design of dough blender for making pie crust. It assures a thorough blending of the shortening with the flour without working the same with the hands, and the resulting crust has the flakiness desired.

The principal object of my invention, is to provide a utensil that not only blends the shortening and flour by a cutting action of bowed wire blades but adds a gentle and positively limited kneading action afforded by wider flattened strips that are similarly bowed and disposed in alternate relationship with the spaced wires and with their tread portions in slightly elevated relationship to the tread portions of the wires, thus bringing about a thorough blending of the products in a much shorter time than is possible with the older style blenders now on the market.

The device of my invention has been designed not only with a view to efficiency for use in the particular kind of work referred to, but also with a view to simplicity and economy of construction, a special feature of the construction being the novel assembling of the bowed wires and strips in the side plates and the novel assembling of the side plates on the ends of the handle so that there is no necessity for any protruding screw or rivet heads and all surfaces are smooth and joints are tight and flush thus obtaining neater appearance and assuring easy and thorough cleaning, in addition to assuring durability.

The invention is illustrated in the accompanying drawings, in which—

Figure 1:
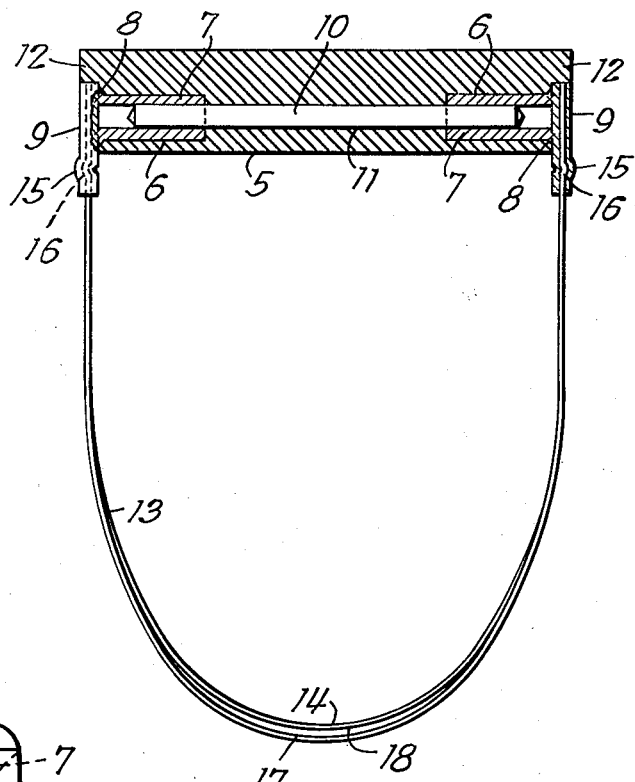
Figure 2:
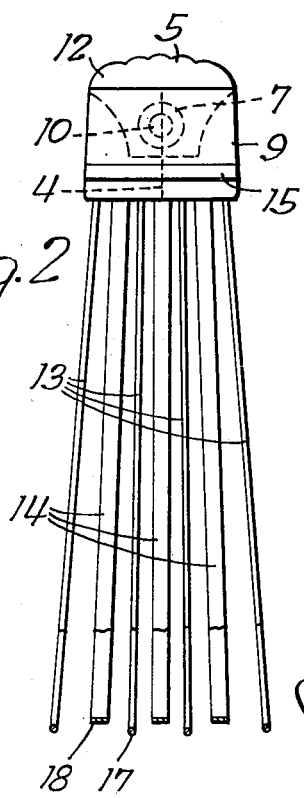

Fig. 1 is a face view of a dough blender made in accordance with my invention, showing the handle assembly and one of the side plates in longitudinal section, and Fig. 2 is a side view of the blender.

The same reference numerals are applied to corresponding parts in these two views.

The utensil illustrated comprises a hollow handle 5, formed from any suitable and desirable plastic, in the opposite ends of which are sockets or counterbores 6 to receive tubular metal projections 7 that are welded, as at 8, to side plates 9, a rod 10 being entered through the longitudinal hole 11 in the handle 5 with its end portions pressed into the tubular projections 7 to tie the handle structure together. The side plates 9 are of double thickness, the opposite edge portions being bent inwardly and pressed together to embed therebetween the ends of the wires and strips forming the cutters and kneaders hereinafter described for a good connection and one which does not involve the expense or need of soldering or welding. The meeting line of the bent in edge portions is indicated at 4 in Fig. 2. The ends 12 of the handle 5 overlie the tops of the side plates 9, to prevent turning of the handle relative to the side plates. The latter are of a soft sheet metal for a purpose similar to that described in my earlier Dennis Patent 1,735,236. A plurality of blade-like cutters 13 of bowed music wire or the like are provided in spaced relation with wider flattened and similarly bowed strips 14 therebetween, both being carried by their cut ends on the side plates 8. These cutters 13 are of hard spring wire, or may be of any other type of wire suitable for the present purpose, and the wider flattened kneading strips 14 are of spring steel of sufficient hardness and flexibility to meet the present requirements. The hardness of the wire and of the flattened strips is taken advantage of in this construction in the fastening of these elements in the side plates similarly as in the earlier Dennis patent mentioned above, namely, by embedding these hardened parts in the softer sheet metal of the side plates under pressure to maintain them in their spaced diverging relation, better anchorage, however, being obtained by forming a transverse rib 15 in the lower portions of the plates after the wires 13 and strips 14 are assembled therein, whereby to cause small buckled portions 16 in their ends to prevent removal. Each of the wires and each of the strips, it will be observed, is bowed outwardly with reference to the handle to provide tread portions 17 and 18, respectively, intermediate the ends thereof. The group of wires 13 have the lowermost points of their tread portions 17 disposed in a plane slightly below the plane in which the lowermost points of the tread portions 18 of the strips 14, as clearly appears in Fig. 2, are disposed. This is an important feature of my invention, inasmuch as with this arrangement of the treads, the wire-blades 11 blend the shortening and flour by a cutting action first and the gentle and positively limited kneading action of the flattened strips follows, thereby securing a novel and highly desirable combination action on the dough, with the result that the shortening and flour are mixed more quickly and easily and the much desired result of flakiness of the crust is assured. Also, it will be evident that the longitudinal arcuateness and transverse arcuateness of the tread portion makes the blender easily usable in mixing bowls of diverse shapes, and the novel combination action referred to is always obtained.

It is believed the foregoing description conveys a good understanding of the objects and advantages of my invention. The appended claims have been drawn to cover all legitimate modifications and adaptations.

I claim:

1. A dough blender comprising a plurality of bowed spring wires as dough mixers or cutters disposed with their arcuate intermediate portions in spaced substantially parallel relation, a plurality of bowed strips, each of a width several times the thickness of the wire, as dough kneaders disposed with their arcuate intermediate portions between the intermediate portions of the wires, and a handle disposed with its ends adjacent and in transverse relation to the ends of said wires and strips and secured thereto.

2. A dough blender comprising a plurality of bowed spring wires as dough mixers or cutters disposed with their arcuate intermediate portions in spaced substantially parallel relation, a plurality of bowed strips, each of a width several times the thickness of the wire, as dough kneaders disposed with their arcuate intermediate portions between the intermediate portions of the wires, and a handle disposed with its ends adjacent and in transverse relation to the ends of said wires and strips and secured thereto, the arcuate intermediate portions of said strips being in fixed elevated relation to the arcuate intermediate portions of said wires.

3. A dough blender comprising a plurality of bowed spring wires as dough mixers or cutters disposed with their arcuate intermediate portions in spaced substantially parallel relation, a plurality of bowed strips, each of a width several times the thickness of the wire, as dough kneaders disposed with their arcuate intermediate portions between the intermediate portions of the wires, and a handle disposed with its ends adjacent and in transverse relation to the ends of said wires and strips and secured thereto, the arcuate intermediate portions of said strips being in fixed elevated relation to the arcuate intermediate portions of said wires, the strips being disposed with their lowermost portions in one horizontal plane and the wires being disposed with their lowermost portions in another lower horizontal plane.

4. In a handle construction for a kitchen utensil and the like, a hollow elongated handle having counterbores in its opposite ends, opposed side members to be fastened to the opposite ends of said handle, tubular projections on said side members received in said counterbores, and a pin extending lengthwise in said handle and having a press fit at its opposite ends in said tubular projections.

5. In a handle construction for a kitchen utensil and the like, a hollow elongated handle having counterbores in its opposite ends, opposed side members to be fastened to the opposite ends of said handle, tubular projections on said side members received in said counterbores, and a pin extending lengthwise in said handle and having a press fit at its opposite ends in said tubular projections, the handle having projections on the ends thereof which by abutment with the edges of said side members prevent turning of said handle.

6. A dough blender comprising a plurality of bowed spring wires as dough mixers or cutters disposed with their arcuate intermediate portions in spaced substantially parallel relation, a plurality of flat bowed strips, each presenting a flat tread surface that is wide in comparison to the thickness of the wire, as dough kneaders disposed with their arcuate intermediate portions between the intermediate portions of the wires, and a handle disposed with its ends adjacent and in transverse relation to the ends of said wires and strips and secured thereto.

7. A dough blender comprising a plurality of bowed spring wires as dough mixers or cutters disposed with their arcuate intermediate portions in spaced substantially parallel relation, a plurality of flat bowed strips, each presenting a flat tread surface that is wide in comparison to the thickness of the wire, as dough kneaders disposed with their arcuate intermediate portions between the intermediate portions of the wires, and a handle disposed with its ends adjacent and in transverse relation to the ends of said wires and strips and secured thereto, the arcuate intermediate portions of said strips being in elevated relation to the arcuate intermediate portions of said wires.

8. A dough blender comprising a plurality of bowed spring wires as dough mixers or cutters disposed with their arcuate intermediate portions in spaced substantially parallel relation, a plurality of flat bowed strips, each presenting a flat tread surface that is wide in comparison to the thickness of the wire, as dough kneaders disposed with their arcuate intermediate portions between the intermediate portions of the wires, and a handle disposed with its ends adjacent and in transverse relation to the ends of said wires and strips and secured thereto, the arcuate intermediate portions of said strips being in fixed elevated relation to the arcuate intermediate portions of said wires, the strips being disposed with their lowermost portions in one horizontal plane and the wires being disposed with their lowermost portions in another lower horizontal plane.

E. LUCIAN DENNIS.

REFERENCES CITED

The following references are of record in the file of this patent:

UNITED STATES PATENTS

| Number | Name | Date |
|---|---|---|
| 140,067 | Munson | June 17, 1873 |
| 565,130 | Berst | Aug. 4, 1896 |
| 1,007,891 | Read | Nov. 7, 1911 |
| 1,735,236 | Dennis | Nov. 12, 1929 |
| 1,895,833 | Baker | Jan. 31, 1933 |
| 2,357,886 | Gamache | Sept. 12, 1944 |